United States Patent
Park et al.

(10) Patent No.: US 9,273,723 B2
(45) Date of Patent: Mar. 1, 2016

(54) COMPOSITE MAGNETIC BEARING HAVING AUXILIARY BEARING COUPLED THERETO

(71) Applicant: KOREA INSTITUTE OF MACHINERY & MATERIALS, Daejeon (KR)

(72) Inventors: Cheol-Hoon Park, Daejeon (KR); Sang-Kyu Choi, Daejeon (KR); Sang-Yong Ham, Daejeon (KR); Doo Euy Hong, Daejeon (KR); Tae Gwang Yoon, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 14/366,074

(22) PCT Filed: Jun. 17, 2013

(86) PCT No.: PCT/KR2013/005323
§ 371 (c)(1),
(2) Date: Jun. 17, 2014

(87) PCT Pub. No.: WO2013/191422
PCT Pub. Date: Dec. 27, 2013

(65) Prior Publication Data
US 2014/0361651 A1    Dec. 11, 2014

(30) Foreign Application Priority Data

Jun. 19, 2012  (KR) .................. 10-2012-0065578

(51) Int. Cl.
*F16C 32/04*    (2006.01)

(52) U.S. Cl.
CPC ........... *F16C 32/0406* (2013.01); *F16C 32/048* (2013.01); *F16C 32/0442* (2013.01); *F16C 32/0465* (2013.01)

(58) Field of Classification Search
CPC ........... H02K 7/09; F16C 19/02; F16C 19/22; F16C 19/50; F16C 17/00; F16C 21/00; F16C 32/00–43/00
USPC .................................. 310/90.5; 384/445
See application file for complete search history.

(56) References Cited

U.S. PATENT DOCUMENTS 4,629,261 A * 12/1986 Eiermann ........... F16C 32/0442
                                                    251/30.01
4,641,978 A *  2/1987 Kapich .................. F01D 25/16
                                                       310/90.5

(Continued)

FOREIGN PATENT DOCUMENTS

JP      06-326751      12/1996
JP      08-326751      12/1996

(Continued)

OTHER PUBLICATIONS

Chris Rehmanm Improvements in bearing life using sealing technology. Proceedings of the twenty-second international pump users symposium 2005. p. 104.*

*Primary Examiner* — Dang Le
(74) *Attorney, Agent, or Firm* — Lex IP Meister, PLLC

(57) ABSTRACT

The present invention relates to a composite magnetic bearing having an auxiliary bearing coupled thereto, which has an improved structure for minimizing a length of a rotor and a system volume. The composite magnetic bearing of a radial type provided around a rotor having an auxiliary bearing coupled thereto for reducing friction, includes a magnetic bearing, and an auxiliary bearing fixed in the empty space in an inside of the stator cores on an inner side of a position the coils and the permanent magnets are provided thereto.

4 Claims, 5 Drawing Sheets

(56) References Cited

U.S. PATENT DOCUMENTS

| | | | |
|---|---|---|---|
| 5,021,697 A * | 6/1991 | Kralick | 310/90.5 |
| 5,126,610 A * | 6/1992 | Fremerey | 310/90.5 |
| 5,315,197 A * | 5/1994 | Meeks | F16C 32/0476 310/90.5 |
| 5,462,470 A * | 10/1995 | Oda | B23Q 1/262 310/90.5 |
| 6,135,640 A * | 10/2000 | Nadjafi | 384/103 |
| 6,313,555 B1 * | 11/2001 | Blumenstock et al. | 310/90.5 |
| 6,353,273 B1 | 3/2002 | Heshmat et al. | |
| 6,617,733 B1 * | 9/2003 | Yamauchi | F04D 19/048 310/90.5 |
| 7,307,365 B2 * | 12/2007 | Fremerey | F16C 32/0476 310/90 |
| 2010/0181854 A1 * | 7/2010 | Breucker | F16C 32/0493 310/90.5 |

FOREIGN PATENT DOCUMENTS

| | | |
|---|---|---|
| JP | 2001-074050 | 3/2001 |
| JP | 2002-139037 | 5/2002 |
| JP | 2002-199655 | 7/2002 |
| KR | 10-2009-0070178 | 7/2009 |
| KR | 10-2010-0054243 | 5/2010 |
| KR | 2011-0097386 | 8/2011 |

* cited by examiner

COMPOSITE MAGNETIC BEARING HAVING AUXILIARY BEARING COUPLED THERETO

TECHNICAL FIELD

The present invention relates to a composite magnetic bearing having an auxiliary bearing coupled thereto. More particularly, the present invention relates to a composite magnetic bearing having an auxiliary bearing coupled thereto, which has an improved structure for minimizing a length of a rotor and a system volume.

BACKGROUND ART

There have been different bearings provided to components having movement, such as a rotational or reciprocating movement (Rotor shaft or a moving shaft), for resolution of different problems liable to take place in movement of the component due to friction, such as problems of abrasion, damage, a problem of noise, and a problem of energy waste. In general, in the bearings used widely, there are sliding bearings, rolling bearings, wherein the sliding bearing is mounted to surround a shaft with lubricating oil provided to a portion in contact with the bearing, and the rolling bearing has rotatable components, such as balls or rollers, placed in a portion in contact with the bearing for minimizing the friction.

Those bearings used widely classically have a contact with the shaft taken place at any of the portion of the bearing without fail. Recently, use of a magnetic bearing is expanding in different fields for having no contact with the shaft, thereby minimizing the friction, really. As disclosed in the Korea Laid Open Patent No. 2009-0070178 ("A system for measuring cylindrical radial direction displacement of a magnetic bearing which uses capacitance and a method for determining whether the magnetic bearing has a fault taken place or not therein", Laid Open on Jul. 1, 2009), the magnetic bearing is made to serve as a bearing by arranging a magnet having a strong magnetism or an electro-magnet around a shaft to make the shaft to be buoyant by magnetic levitation. Since the magnetic bearing has no contact with the shaft at all to make the friction to be zero, causing no abrasion or damage to the component, the magnetic bearing has many advantages, such as a long life time and a very low noise. However, in general, rather than designing the magnetic bearing to support the shaft only with the magnetic bearing, the auxiliary bearing which has direct contact with the shaft is provided in addition to the magnetic bearing for making securer supporting of the shaft, actually.

FIG. 1 illustrates a cross-sectional view of a rotor having a related art magnetic bearing provided thereto. As shown, in general, the rotor 1 rotated by a motor 2 has a plurality of bearings 3, 4, 6, 7, 9 and gap sensors 5, 8, 10 provided thereto. Since the rotor 1 has a columnar shape extended in one direction, in general, the rotor 1 has at least two radial bearings provided to an upper side and a lower side thereof respectively, and a thrust bearing provided to one side. In FIG. 1, since the radial bearings and the thrust bearing are the magnetic bearings 3, 6, and 9 for supporting the rotor 1 by the magnetic levitation, the radial bearings and the thrust bearing have no direct contact with the rotor 1.

When all of the rotor and the magnetic bearing system are in regular operation, the radial magnetic bearings 3 and 6 are in operation to support the rotor 1 by the magnetic levitation. However, if the system is stationary, since no power is supplied to the radial magnetic bearings 3 and 6 to generate no magnetic force, the radial magnetic bearings 3 and 6 cannot support the rotor 1. Consequently, for this case, the rotor 1 is provided with radial auxiliary bearings 4 and 7 in a mode of a general contact type bearing, such as the ball bearing. The radial auxiliary bearings 4 and 7 serve, not only to support the rotor 1 when the system is stationary, but also to support the rotor 1 even at the time of fault of the system for the rotor 1 to come to a safe stop of the rotation without damage thereto as far as possible. Accordingly, such radial auxiliary bearings 4 and 7 are essential components to be provided to the rotor. Though it has a mode different from FIG. 1, but has a structure similar to FIG. 1, a device is disclosed in Korea Laid Open Patent No. 2010-0054243 (Touch down ball bearing having a spring-damper system, Laid Open on May 25, 2010) of a mode in which the ball bearing is provided to a rotatable body in supplementation of the magnetic bearing together with the magnetic bearing.

In order to secure a space for providing the radial auxiliary bearings 4 and 7, the rotor 1 is designed to increase a length of the rotor 1 as much as a volume the radial auxiliary bearings 4 and 7 are to occupy. However, there is a problem in that, since the longer the length of the rotor 1, the larger the volume of the system itself. In addition to this, since there is a problem in that, since the longer the length of the rotor 1, the lower a critical speed of the rotor 1 in a bending mode, there is a limitation in increasing an operation speed of the rotor 1.

PRIOR ART DOCUMENTS

Patent Documents (Patent Document 1) 1. Korea Laid Open Patent No. 2009-0070178 ("A system for measuring cylindrical radial direction displacement of a magnetic bearing which uses capacitance and a method for determining whether the magnetic bearing has a fault taken place or not therein", Laid Open on Jul. 1, 2009).

(Patent Document 2) 2. Korea Laid Open Patent No. 2010-0054243 (Touch down ball bearing having a spring-damper system, Laid Open on May 25, 2010).

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a composite magnetic bearing having an auxiliary bearing coupled thereto having advantages of having an improved structure for minimizing a length of a rotor and a system volume.

Accordingly, an object of the present invention, for solving the problem of the related art, is to provide a composite magnetic bearing having an auxiliary bearing coupled thereto which has an improved structure for minimizing a length of a rotor and a system volume.

Technical Solution

To achieve the object of the present invention, a composite magnetic bearing of a radial type having an auxiliary bearing coupled thereto provided around a rotor for reducing friction includes a magnetic bearing including a rotor core provided thereto attached to a circumference of the rotor, a plurality of stator cores provided thereto arranged around the rotor core in a radial direction to form an empty space therein, a plurality of permanent magnets respectively provided to an outermost side of the stator cores, and a plurality of coils provided to the stator cores to surround the permanent magnets to place the permanent magnets at a center thereof respectively, and an auxiliary bearing fixed in the empty space in an inside of the stator cores on an inner side of a position the coils and the permanent magnets are provided thereto.

In this case, the magnetic bearing may be a homopolar type magnetic bearing.

And, the auxiliary bearing may be a rolling type bearing including a ball bearing and a roller bearing.

And, the auxiliary bearing may be fixed and supported by an auxiliary bearing housing fixed and coupled to the stator cores.

And, the composite magnetic bearing may further include a magnetic bearing housing formed to surround an outside of the magnetic bearing. In this case, the composite magnetic bearing may further include a gap sensor provided at one side of the magnetic bearing housing for measuring a gap between the composite magnetic bearing and the rotor.

Advantageous Effects

In accordance with an exemplary embodiment of the present invention, a rotor having both of a non-contact type magnetic bearing and a contact type auxiliary bearing can reduce a length of the rotor as much as a space required for securing a related art auxiliary bearing by providing the auxiliary bearing in the non-contact type magnetic bearing. By minimizing the length of the rotor thus, an entire system volume can be reduced. Along with this, the reduction of the rotor length shorter than the related art permits to elevate the critical speed higher than the related art in a rotor bending mode, thereby enlarging an operation speed range in which the rotor can be operated, securely.

<Description of Symbols>

Figure 1:
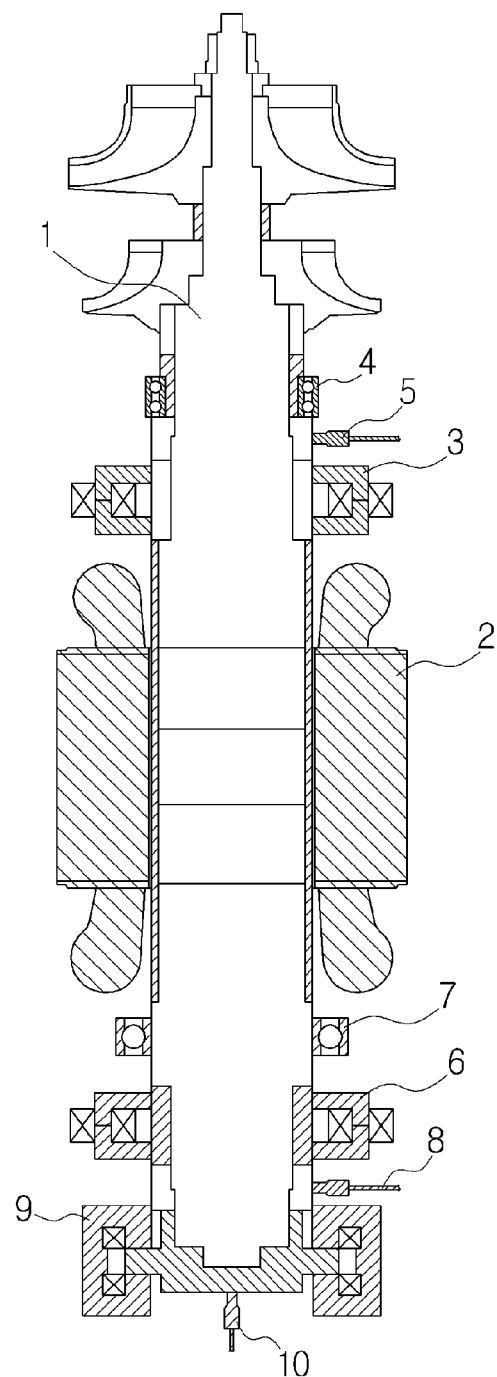
FIG. 1 illustrates a cross-sectional view of a rotor having a related art magnetic bearing provided thereto.

| | |
|---|---|
| 100: composite magnetic bearing | 111: coil |
| 110: magnetic bearing | 113: stator core |
| 112: permanent magnet | 115: magnetic bearing housing |
| 114: rotor core | 121: auxiliary bearing housing |
| 120: auxiliary bearing | 510: motor |
| 500: rotor | |

MODE FOR INVENTION

The exemplary embodiments of the present invention will be described in detail for persons in this field of art to carry out easily with reference to the attached drawings. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In description of the specification, "~ on" means a position above or below an objective member, but not a position above the objective member with reference to a gravity direction, without fail.

A composite magnetic bearing having an auxiliary bearing coupled thereto in accordance with an exemplary embodiment of the present invention will be described with reference to the attached drawings.

Figure 2:
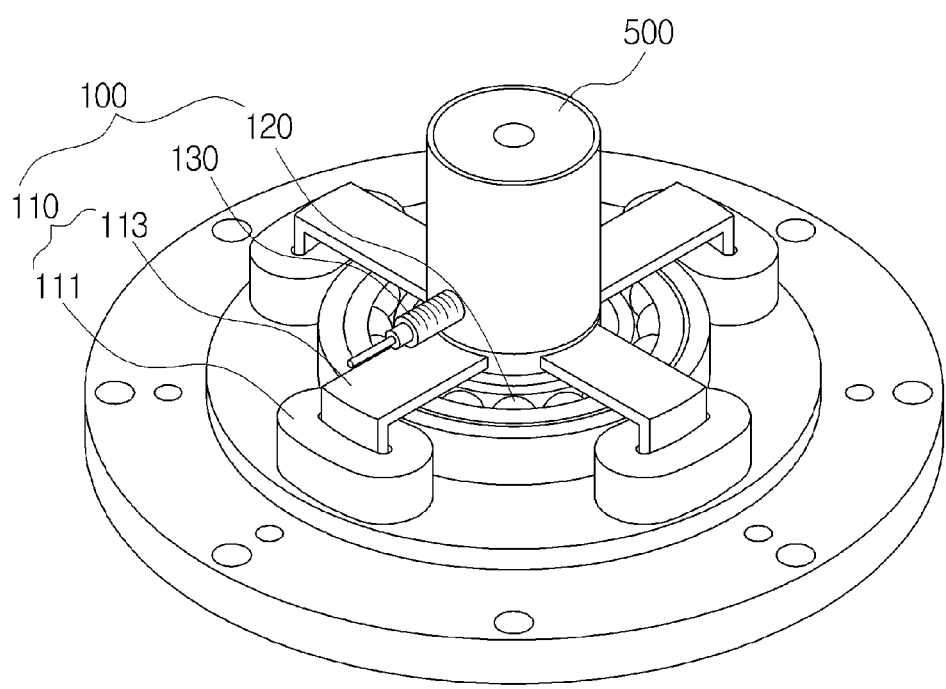
FIG. 2 illustrates a perspective view of a composite magnetic bearing in accordance with an exemplary embodiment of the present invention.
Figure 3:
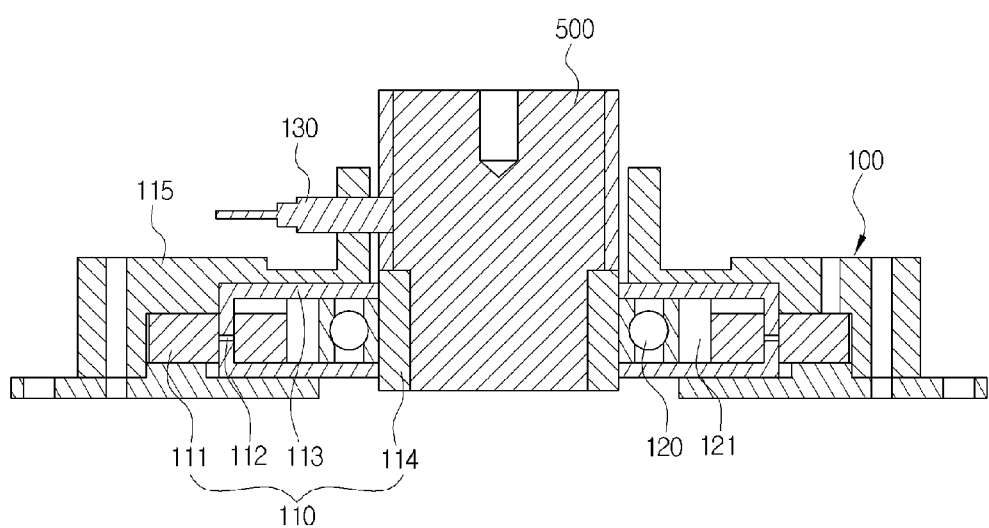
FIG. 3 illustrates a cross-sectional view of a composite magnetic bearing in accordance with an exemplary embodiment of the present invention.

FIG. 2 illustrates a perspective view of a composite magnetic bearing in accordance with an exemplary embodiment of the present invention, and FIG. 3 illustrates a cross-sectional view of a composite magnetic bearing in accordance with an exemplary embodiment of the present invention. A structure of the composite magnetic bearing of the present invention will be described with reference to FIGS. 2 and 3.

The composite magnetic bearing 100 in accordance with an exemplary embodiment of the present invention is of a radial type provided around a rotor 500 for reducing friction, basically. In this case, the composite magnetic bearing 100 has a structure in which a magnetic bearing 110 and an auxiliary bearing 120 are coupled together.

The magnetic bearing 110 includes a rotor core 114 provided thereto attached to a circumference of the rotor 500, a plurality of stator cores 113 provided thereto arranged around the rotor core 114 in a radial direction to form an empty space therein, a plurality of permanent magnets 112 respectively provided to an outermost side of the stator cores 113, and a plurality of coils 111 provided to the stator cores 113 to surround the permanent magnets 112 to place the permanent magnets 112 at a center thereof, respectively. That is, each of the stator cores 113 has the permanent magnet 112 provided to a farthest side from the rotor 500, with the coil 111 provided to surround the permanent magnet 112. And, as shown, the coil 111 is formed to be wound on an axis in a direction the same with an axis direction of the rotor 500. Thus, the plurality of the stator cores 113 having the coils 111 and the permanent magnets 112 provided thereto respectively are arranged around the rotor core 114 in a radial direction.

Upon application of power, each of the coils 111 and the permanent magnets 112 in the stator cores 113 generates magnetic force. The rotor 500 has forces applied thereto from respective directions in which the stator cores 113 are provided, and the rotor 500 is levitated in a space among the plurality of the stator cores 113 by repulsive forces against the stator cores 113, accordingly. Such a phenomenon is owing to a very principle of the magnetic levitation. Thus, the magnetic bearing 110 supports the rotor 500 by using the magnetic levitation principle. By controlling intensity, a direction, a phase, and a frequency of power being supplied to the coils 11, the magnetic force the bearing generates may be controlled.

In this case, as can be known from the structure of the magnetic bearing 110, it is preferable that the magnetic bearing 110 is a homopolar type magnetic bearing. The homopolar type magnetic bearing has no problem of heat generation caused by an eddy current in comparison to a heteropolar type, easy to fabricate a shaft core, and energy consumption can be minimized since the permanent magnets and the electric magnets (Coils) are used together. And, since the electric magnet core is arranged in the shaft direction, a more clearance can be secured in a circumferential direction of the shaft.

In this case, as described before, in general, when the rotor 500 is supported only with the magnetic bearing 110, the following problems take place. Since the magnetic bearing 110 comes into operation upon application of power thereto, to generate the magnetic force normally when the entire system is operated normally (i.e., when the power is supplied both to the magnetic bearing 110 and the rotor 500 normally), there is no problem in that the magnetic bearing 110 supports the rotor 500 in a state the magnetic bearing 110 is not in contact with the rotor 500. However, in a system stationary state, since no power is supplied both to the magnetic bearing 110 and the rotor 500, making the magnetic bearing 110 to generate no magnetic force, the rotor 500 is in a state in which the rotor 500 is in contact with the magnetic bearing 110.

Of course, if it is a state the rotor 500 does not rotate, there may be no problem even if the rotor 500 is in contact with the magnetic bearing 110, the problem is when the system has a fault.

If the magnetic bearing 110 is not in operation normally because the power supply to the magnetic bearing 110 is at fault even if the rotor 500 keeps rotating, the bearing 110 cannot but be brought into contact with the rotor 500. In this case a problem is liable to take place, in that the magnetic bearing 110 may be damaged by the rotation of the rotor 500, and, as the rotor 500 is making very much unstable rotation, there is high possibility of accident, such as damage to an entire system.

In order to avoid such a problem, in the related art, an auxiliary bearing is provided on the rotor in addition to a magnetic bearing (corresponding to the magnetic bearing 110) as shown in FIG. 1. However, the additional auxiliary bearing causes the following problem. In order to secure a space for providing the auxiliary bearing to the rotor, at least an additional length of the rotor as much as a length of the auxiliary bearing is required, and that increases a volume of an entire system. In addition to this, as a bending occurrence tendency of the rotor increases according to the increased rotor length, a critical speed value becomes low, which is a threshold speed at which the rotor may rotate securely in the bending mode. Consequently, a problem takes place at the end, in that an operation speed range in which stable rotation of the rotor may be made is reduced.

In the present exemplary embodiment, a composite magnetic bearing 100 is suggested, having a structure in which the auxiliary bearing 120 is coupled to an inside of the magnetic bearing 110 for preventing the problems caused by the increased length of the rotor as well as making stable operation even at the time of system stop or malfunction of the system.

The auxiliary bearing 120 is fixed in an empty space in an inside of the stator cores 113 on an inner side (Close to the rotor) of a position the coils 111 and the permanent magnets 112 are provided thereto. For making more secure coupling, as shown, it is preferable that the auxiliary bearing 120 is fixed and supported by an auxiliary bearing housing 121 which is fixed and coupled to the stator core 113.

And, it is preferable that the auxiliary bearing 120 is of a rolling bearing type including a ball bearing, and a roller bearing. As described before, the auxiliary bearing 120 is provided for making secure supporting of the rotor 500 at the time of system stop or, particularly, system malfunction. Therefore, it is needless to say that the auxiliary bearing 120 is required to have rigidity enough to endure when the auxiliary bearing 120 is brought into contact with the rotor 500, as well as endure an external impact or vibration to a certain extent. Along with this, as described before, in the present invention, the most fundamental reason of employing a structure in which the auxiliary bearing 120 is provided in the magnetic bearing 110 is for reducing very length of the rotor 500. The bearing used as the auxiliary bearing 120 also has a length thereof which is formed not long.

Taking those conditions into account, a bearing in a mode of a ball bearing or the like is appropriate to use as the auxiliary bearing 120, which has adequate rigidity enough to support the rotor without risk of damage even in cases of contact to the rotor and impact, and enables to form to have a short length. Accordingly, it is preferable that the auxiliary bearing 120 is a bearing in a mode of a ball bearing.

Referring to FIG. 3, it is preferable that the composite magnetic bearing 100 has a magnetic bearing housing 115 formed to surround an outside of the magnetic bearing 110, additionally. The magnetic bearing housing 115 protects different components, such as the magnetic bearing 110, from an outside.

Along with this, in this case, the composite magnetic bearing 100 may further include a gap sensor 130 provided at one side of the magnetic bearing housing 115 for measuring a gap between the composite magnetic bearing 100 and the rotor 500. Referring to the related art bearing system in FIG. 1, it can be known that a gap sensor is provided separately for measuring the gap between the rotor and the bearing. In this case, since the composite magnetic bearing 100 of the present invention has the gap sensor 130 provided to the magnetic bearing 110 too, not increasing a space for providing the gap sensor 130 unnecessarily, effects of space utilization and minimizing a rotor length can be maximized.

Figure 4:
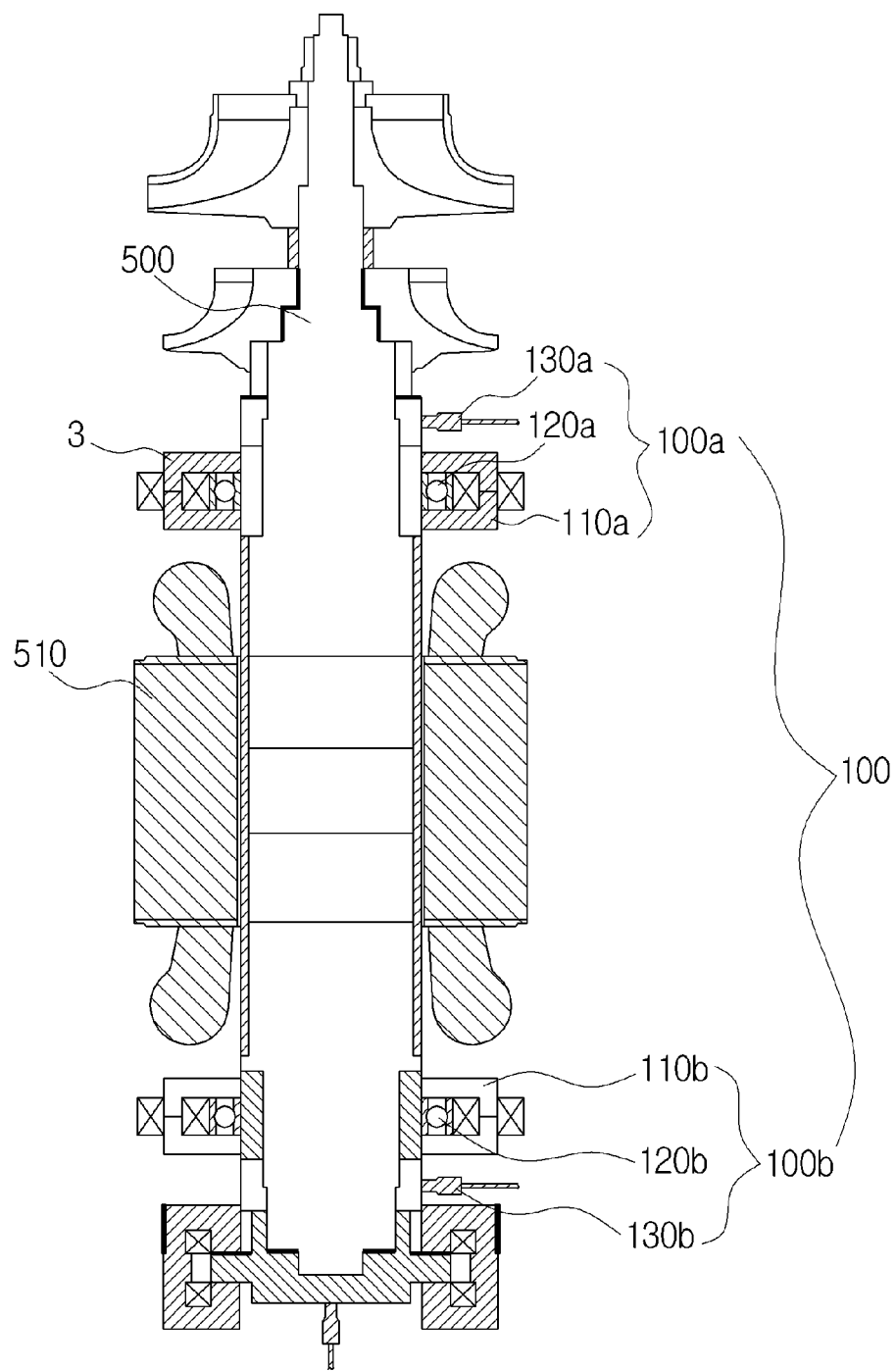
FIG. 4 illustrates a cross-sectional view of a rotor having a composite magnetic bearing in accordance with an exemplary embodiment of the present invention provided thereto.
Figure 5:
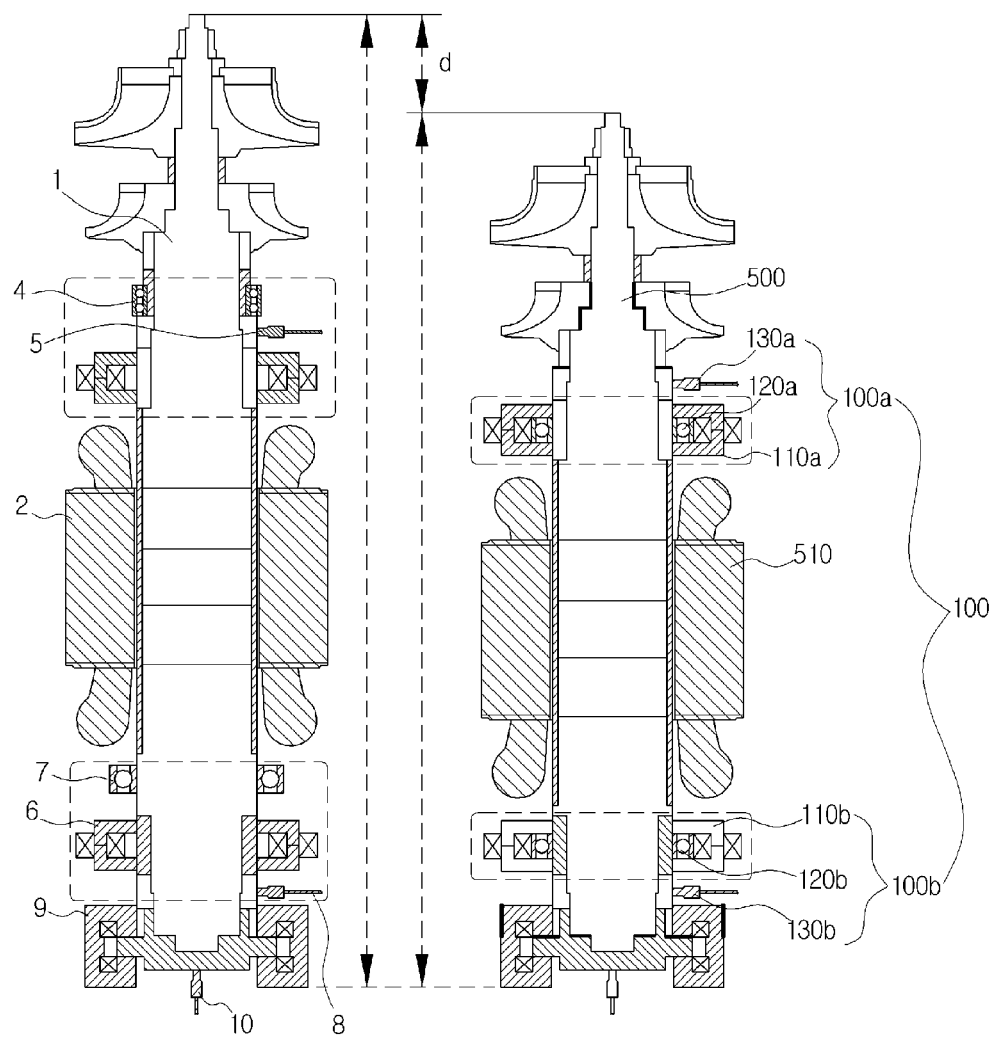
FIG. 5 illustrates cross-sectional views for comparing rotors of a related art magnetic bearing and a composite magnetic bearing in accordance with an exemplary embodiment of the present invention.

FIG. 4 illustrates a cross-sectional view of a rotor having a composite magnetic bearing in accordance with an exemplary embodiment of the present invention provided thereto, and FIG. 5 illustrates cross-sectional views for comparing rotors of a related art magnetic bearing and a composite magnetic bearing in accordance with an exemplary embodiment of the present invention. Advantages obtainable by employing the composite magnetic bearing of the present invention will be described with reference to FIGS. 4 and 5, in more detail.

In the present exemplary embodiment, the magnetic bearing 110 (Even in a case the auxiliary bearing 120 does not exist) has a clearance therein, originally. Therefore, the auxiliary bearing 120 may be mounted in the clearance existed originally in the magnetic bearing 110. That is, since there will be no case of requiring increasing the volume of the magnetic bearing 110 or the like at all, if it is intended to mount the composite magnetic bearing 100 of the present invention, what is required is to secure only the space in which the magnetic bearing 110 has been mounted to the rotor 500, originally. That is, the composite magnetic bearing 100 of the present exemplary embodiment permits to minimize influences of increase of the rotor length and increase of a system volume caused by mounting the auxiliary bearing on the rotor.

Thus, since the influences of unnecessary increases of the length only for mounting the bearing when the bearing is mounted on the rotor are removed, the rotor 500 can be formed shorter than the related art, substantially. In the meantime, referring to FIG. 4, since the rotor is formed extended in one direction, in general, at least two of the bearings are provided to both ends of the rotor (FIG. 4 illustrates a case in which two composite magnetic bearings in accordance with the present exemplary embodiment are provided, wherein each of the composite magnetic bearings are denoted with reference symbols of 100*a*, and 100*b*). In the related art, since the auxiliary bearing is provided in the vicinity of the magnetic bearing without fail when it is required to provide the magnetic bearing (See FIG. 1), it is required that at least two sets of the magnetic bearing and the auxiliary bearing, at least four bearings at the end in total, are provided to the rotor. However, since the composite magnetic bearing of the present invention can replace the related art [magnetic bearing+auxiliary bearing] set with one composite magnetic bearing, the more a number of the bearing sets to be provided on the rotor, the larger an effect of reducing the length of the rotor.

FIG. 5 illustrates comparison of a related art rotor (Left side in FIG. 5) having the two bearing sets provided thereto to a rotor (Right side in FIG. 5) having both of the bearing sets replaced with the composite magnetic bearings of the present invention, wherein it can be known that, if the bearing sets are replaced with the composite magnetic bearings of the present invention, an entire length of the rotor 500 becomes shorter substantially as can be noted in the comparative sectional view of FIG. 5 even if it is a case when only two bearing sets are provided.

As described before, the longer the length of the rotor 500, the higher the bending occurrence risk, making a critical speed value low accordingly, which is a threshold speed at which the rotor may rotate securely (In other words, an operation speed range in which the rotor 500 can be operated securely is reduced). However, as shown in FIG. 5, since the length of the rotor 500 can be reduced positively by employing the composite magnetic bearing of the present invention, enabling to increase the critical speed value in the bending mode of the rotor 500 and to increase operation speed range within which the rotor 500 can be operated securely, the rotor 500 can be operated at a speed higher than the related art at the end.

The present invention is not limited to the exemplary embodiment, but includes all range of changes made by a person skilled in this field of art from the exemplary embodiment of the present invention and recognized equivalent to the exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A composite magnetic bearing of a radial type having an auxiliary bearing coupled around a rotor for reducing friction, comprising:
   a magnetic bearing including a rotor core attached to a circumference of the rotor, a plurality of stator cores arranged around the rotor core in a radial direction to form an empty space therein, a plurality of permanent magnets respectively provided to an outermost side of the stator cores, and a plurality of coils provided to the stator cores to surround the permanent magnets to place the permanent magnets at a center thereof, respectively; and
   an auxiliary bearing provided in the empty space, the auxiliary bearing is disposed inner side of a position the coils and the permanent magnets are provided thereto,
   wherein the auxiliary bearing is a rolling type bearing including a ball bearing and a roller bearing, and the auxiliary bearing is held and supported by an auxiliary bearing housing fixed and coupled to the stator cores.

2. The composite magnetic bearing of claim 1, wherein the magnetic bearing is a homopolar type magnetic bearing.

3. The composite magnetic bearing of claim 1, further comprising
   a magnetic bearing housing formed to surround an outside of the magnetic bearing.

4. The composite magnetic bearing of claim 3, further comprising a gap sensor provided at one side of the magnetic bearing housing for measuring a gap between the composite magnetic bearing and the rotor.

\* \* \* \* \*